(12) United States Patent
Jauncey

(10) Patent No.: US 8,920,640 B2
(45) Date of Patent: Dec. 30, 2014

(54) OIL/WATER SEPARATOR

(75) Inventor: Paul Frederick Jauncey, Aylesbury (GB)

(73) Assignee: Gobbler Oil Spill Recovery Ltd, Wingrave, Ayelesbury, Buckinghamshire (GB)

( * ) Notice: Subject to any disclaimer, the term of this patent is extended or adjusted under 35 U.S.C. 154(b) by 523 days.

(21) Appl. No.: 13/300,684

(22) Filed: Nov. 21, 2011

(65) Prior Publication Data

US 2012/0125826 A1 May 24, 2012

Related U.S. Application Data

(60) Provisional application No. 61/416,368, filed on Nov. 23, 2010.

(51) Int. Cl.
*B01D 17/028* (2006.01)
*E02B 15/04* (2006.01)
*C02F 1/40* (2006.01)
*B01D 17/02* (2006.01)
*C02F 1/02* (2006.01)
*B01D 17/04* (2006.01)
*B63B 35/32* (2006.01)
*E02B 15/10* (2006.01)
*B63B 1/12* (2006.01)
*C02F 101/32* (2006.01)
*C02F 103/00* (2006.01)

(52) U.S. Cl.
CPC ........... *E02B 15/046* (2013.01); *C02F 2101/32* (2013.01); *C02F 1/40* (2013.01); *B01D 17/0214* (2013.01); *C02F 1/02* (2013.01); *B01D 17/042* (2013.01); *B63B 35/32* (2013.01); *E02B 15/048* (2013.01); *E02B 15/106* (2013.01); *B63B 1/125* (2013.01); *C02F 2103/007* (2013.01); *Y10S 210/923* (2013.01)
USPC ............ 210/109; 210/187; 210/521; 210/923

(58) Field of Classification Search
None
See application file for complete search history.

(56) References Cited

U.S. PATENT DOCUMENTS 5,158,673 A * 10/1992 Halter .............................. 210/94
5,431,826 A * 7/1995 Becker et al. .................. 210/742

FOREIGN PATENT DOCUMENTS

DE 3206253 C2 * 12/1992
GB 959484 3/1964
KR 20080029978(A) 3/2008

* cited by examiner

*Primary Examiner* — Terry Cecil
(74) *Attorney, Agent, or Firm* — Lewis Brisbois Bisgaard & Smith LLP; Jon E. Hokanson

(57) ABSTRACT

An oil/water separator is provided that is suitable for use aboard an oil spill recovery vessel and elsewhere. The separator comprises a tank structure divided into first and second compartments that communicate via a bottom channel. An inlet pipe supplies an oil/water mix to be separated into the first compartment. An oil suction pipe draws oil out of the first compartment on a continuous or intermittent basis. Water discharges unassisted from the second compartment once the water level in the second compartment has reached a certain level. A heating compartment is provided adjoining the first compartment thereby to enable the oil in the compartment to be heated to reduce its viscosity in cold conditions; this heating compartment is arranged to serve as a reservoir for hydraulic fluid whereby heating of the oil results from heat given up by worked hydraulic fluid returned to the heating compartment after operational use.

20 Claims, 5 Drawing Sheets

OIL/WATER SEPARATOR

This application claims the benefit of Provisional Application No. 61/416,368, filed on Nov. 23, 2010.

BACKGROUND

Oil spills at sea, in lakes, rivers, harbors, marinas or coastal areas are a serious environmental hazard. Wild life, marine life and coastal welfare, including commercial businesses, are at risk with each and every incident.

In responding to an oil spill, critical factors are speed of response and operational efficiency. These factors tend to favour the use of small skimmer-equipped vessels that can be rapidly transported to the area of an oil spill, can work multiple environments (lakes, rivers harbors and at least inshore), and with the use of the latest drum skimmer technology, are reasonably efficient in recovering oil. In contrast, large oil spill recovery vessels generally take longer to respond as they must make their own way by sea to the area of the oil spill, and are operationally limited to deep water. Larger vessels do, however, typically have the capability to sustain their oil recovery operations over longer periods not least because they have much larger storage tanks for recovered oil than can be installed on smaller vessels.

The limited oil storage capacity of many of the current types of small oil spill recovery vessels requires them to periodically cease operation while they transfer recovered oil either to another ship or to a land-based facility. Increasing the size of onboard oil storage tanks has the disadvantage of increasing fuel costs and limiting operational range; furthermore, the use of deck-carried oil storage bladders or tanks has an adverse effect on stability which can be a serious issue at sea. Using a floating oil storage bladder directly coupled to the oil recovery vessel, is also not a good solution as it severely restricts maneuverability.

Although modern skimming equipment is very efficient, a small percentage of water is still picked up with the recovered oil. Storage of this water along with the recovered oil represents a reduction in oil storage capacity and increased fuel costs, that is, a reduction of operational efficiency. It is therefore desirable to provide onboard oil/water separator equipment to remove the remaining water before the recovered oil is stored.

It is an object of the present invention to provide an oil/water separator suitable for use onboard an oil spill recovery vessel.

SUMMARY OF THE INVENTION

The present invention provides an oil/water separator comprising a tank structure divided into first and second compartments that communicate via a bottom channel, an oil/water inlet into the first compartment for supplying an oil/water mix to be separated, an oil suction outlet for drawing oil out of the first compartment, and a water discharge outlet in the second compartment from which water is arranged to start to discharge unassisted once the water level in the second compartment has reached a predetermined level, herein the water discharge level; the tank structure being further divided to provide at least one heating compartment adjoining the first compartment and arranged to act as a reservoir for hydraulic fluid whereby to enable oil in the first compartment to be heated to reduce its viscosity by heat given up by hydraulic fluid returned to the heating compartment after operational use.

BRIEF DESCRIPTION OF THE DRAWINGS

The accompanying drawings illustrate examples of various aspects of the present invention. The illustrated examples are merely examples and do not limit the scope of the claims.

DETAILED DESCRIPTION

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples.

Figure 1:
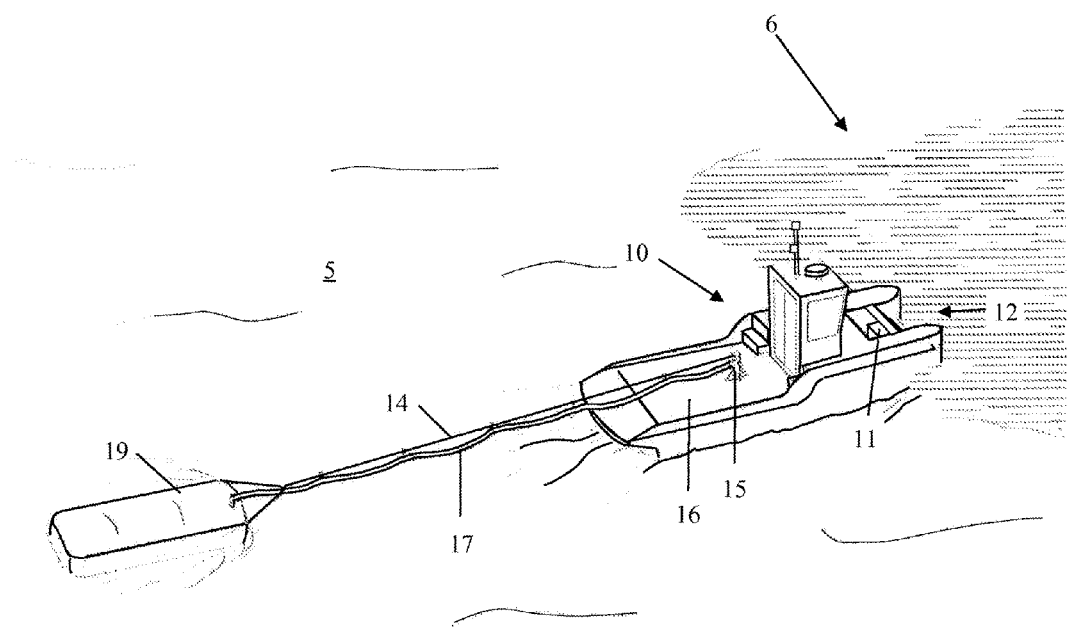
FIG. 1 is a diagram illustrating operation of an oil spill recovery vessel including an oil/water separator that is an example of the present invention.
Figure 2:
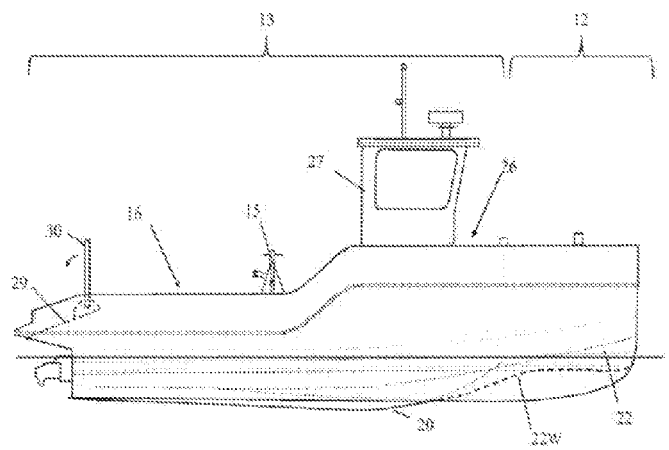
FIGS. 2 and 2A are side and front elevations, respectively, of the FIG. 1 oil spill recovery vessel.
Figure 2A:
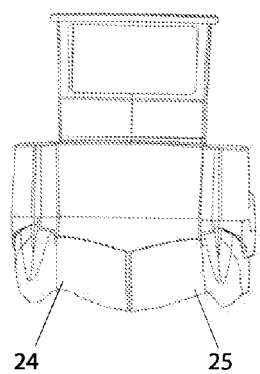
Figure 3A:
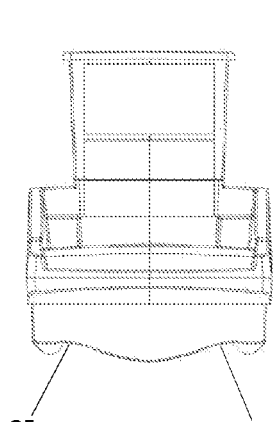
FIGS. 3 and 3A are plan and rear views, respectively, of the FIG. 1 oil spill recovery vessel.
Figure 3:
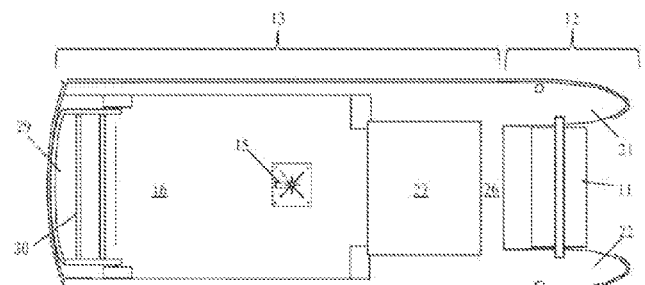

FIG. 1 depicts an oil spill recovery vessel (OSRV) 10 incorporating an oil/water separator that is an example of the present invention. The OSRV 10 is shown operating in an operational mode in which a skimmer unit 11, carried between twin hulls of a catamaran bow section 12 of the OSRV 10, recovers oil from an oil spill 6 on a body of water 5 as the OSRV moves through the oil spill, the recovered oil then being transferred to a towed bladder 19 without interruption of the skimming operation; in this mode of operation, the recovered oil is not stored on the OSRV 10 though it may undergo some processing aboard, for example, to separate out water which the skimmer unit may output along with the recovered oil. The bladder 19 is towed by a towing cable 14 attached to a towing post of an oil transfer bollard 15 mounted on an aft towing deck 16 of the OSRV. Recovered oil is transferred to the bladder 19 through a flexible oil transfer hose 17 that is attached at one end to a oil transfer pipe forming part of the oil transfer bollard 15, and at its other end to a hose coupling integral with the bladder 19; along its length the hose 17 is suspended from the towing cable 14 by slip rings.

The general form of the OSRV 10 is illustrated in FIGS. 2, 2A, 3, and 3A. Aft of the catamaran bow section 12 with the skimmer unit 11, the OSRV comprises a trimaran main section 13 in which a central hull 20 is interposed between the aft continuations of the twin hulls 21, 22 of the catamaran bow section 12. The triple hulls 20, 21, 22 of the trimaran main section 13 have conjoined upper portions with the depth of this conjoining increasing aftwards whereby to define two flow channels 24, 25 of decreasing cross-sectional area between the hulls.

When in the process of oil recovery using the skimmer unit 11, the OSRV 10 operates at slow speed (1-3 knots) and the hulls 21, 22 of the catamaran bow section 12 serve to channel the oil to be recovered to the skimmer unit 11; at the same time, the channels 24, 25 formed between the central hull 20 and the outer hulls 21 and 22 of the trimaran main section 12 help the flow through of water passing under or around the skimmer unit thereby minimizing pile up of the water in front of the skimmer unit 11.

When oil is not being recovered, the skimmer unit 11 can be raised clear of the water 5 enabling the OSRV to proceed at a fast speed (for example, 18-20 knots) and thereby minimize transit time to and from an oil spill. When the OSRV 10 is operating at its fast speed, the trimaran section of the vessel will cause it to plane partially lifting the bow section hulls 21, 22 and keeping the wetted areas to a minimum thereby reducing drag.

Regarding the general above-water arrangement of the OSRV 10, the catamaran bow section 12 and the front part of the trimaran main section 13 provide a raised fore deck 26. Most of the deck area of the main section 13 serves as the towing deck 16 on which the oil transfer bollard 15 is located; the towing deck 16 is at a lower level than the fore deck 26. A wheelhouse structure 27 is located on the front part of the trimaran main section 13 and provides the upper part of a wheelhouse; the wheelhouse extends down into the main section 13 such that the floor of the wheelhouse is substantially at the level of the towing deck 16.

The aft end of the towing deck 16 merges with a scooped transom 29 that slopes downwards towards the stern. An aft deck rail 30 is arranged to fold down from an upright position shown in FIG. 2 to a towing-operation position shown in FIG. 3 in which it lies against the scooped transom 29.

The hull and wheelhouse structure are, for example, made of FRP (fibre reinforced plastic) though other materials, such as aluminum can alternatively be used. Where FRP is used, the bow and main sections 12 and 13 are treated as one and formed as two moldings, that is, a deck molding (including an uppermost portion of the hull), and a middle-and-lower hull molding; these moldings are arranged to fit closely together and a rub strake is used to cover the join.

Figure 4:
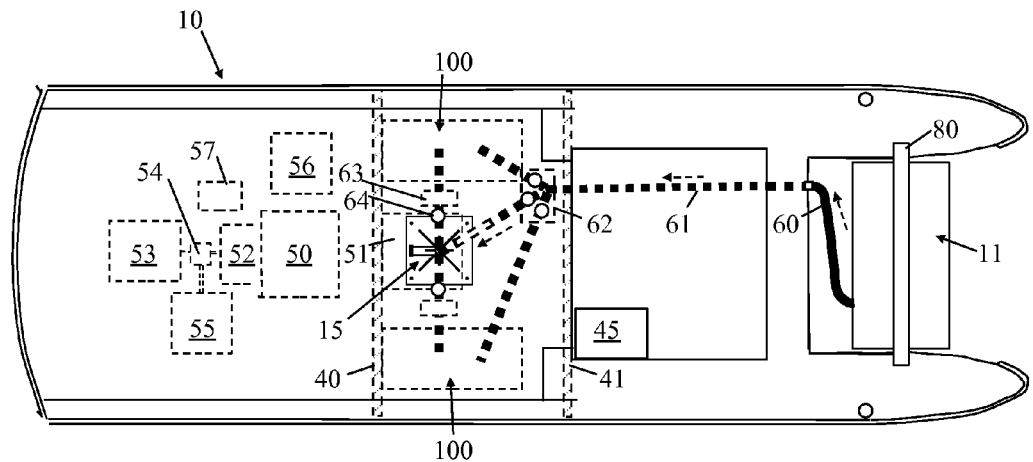
FIG. 4 is a plan view, similar to FIG. 3, showing the internal layout of the FIG. 1 oil spill recovery vessel.
Figure 5:
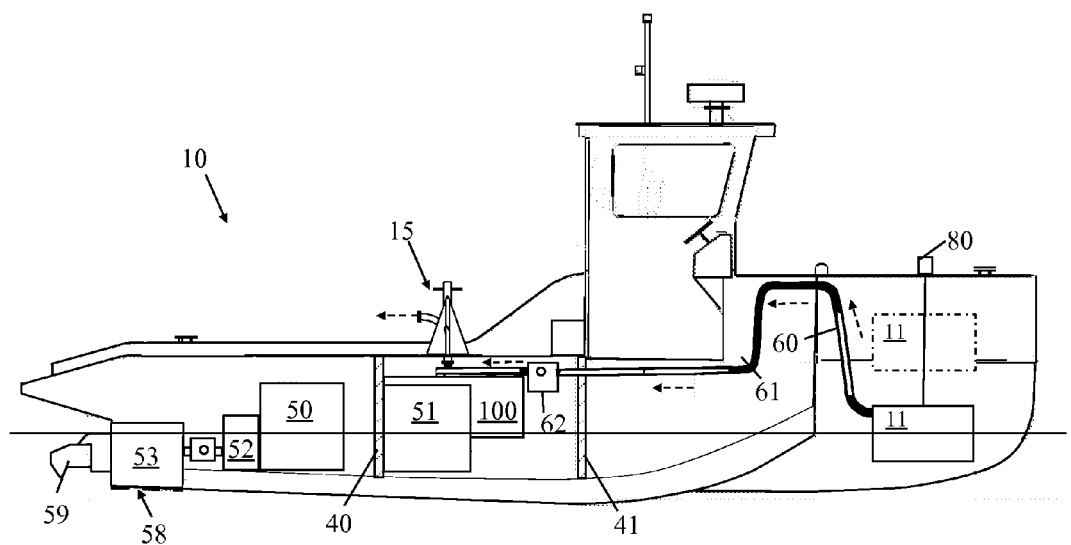
FIG. 5 is a side elevation, similar to FIG. 2, but with the nearside hull removed to show the internal layout of the FIG. 1 oil spill recovery vessel.
Figure 6:
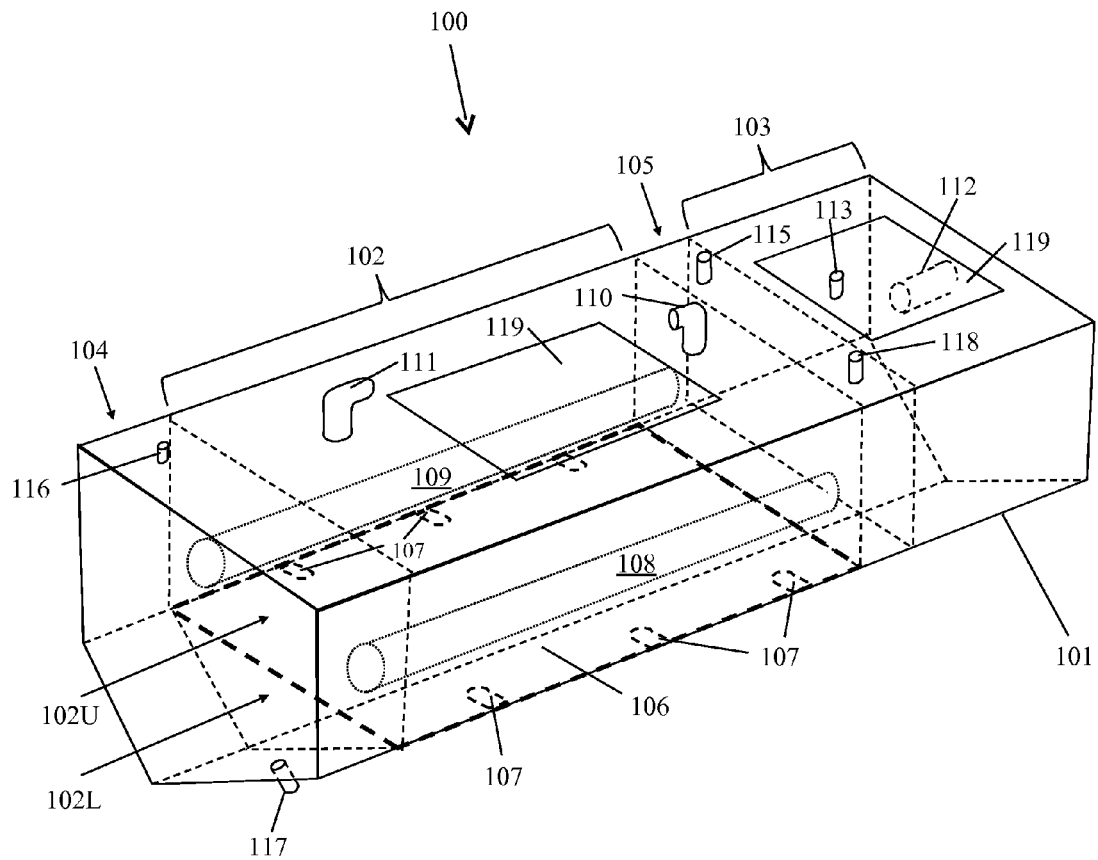
FIG. 6 is a perspective view of the example oil/water separator installed in the FIG. 1 oil spill recovery vessel, showing certain internal detail in dashed outline.

FIGS. 4 and 5 show the general disposition within the OSRV 10 of its propulsion system and central service equipment (hydraulic and electrical power).

A marine diesel engine 50 (for example, 250 HP (184 kw) 4200 rpm supercharged marine diesel) serves both to provide propulsive power and power for the central services. Fuel is supplied to the engine 50 from a fuel tank 51 located between fireproof bulkheads 40, 41. The compartment defined by the bulkheads 40, 41 also houses two oil separators 100 and tanks for hydraulic fluid; in a preferred arrangement, these tanks are incorporated into the oil separators 100 as will be more fully described below.

The propulsion system comprises a water jet drive unit 53 (such as the Ultra-Jet 251 jet drive) powered from the engine 50 via a transmission (such as an Aquadrive transmission from Mack Boring & Parts Co, NJ, USA) comprising a shaft with a constant velocity joint fitted to each end. One of these joints couples to the jet drive unit 53, and the other to a reversible hydraulic marine gearbox 52 (such as the PRM 750 from PRM Marine Ltd, UK). The water intake for the jet drive unit 53 is directly below it and is protected by a screen 58. The water jet outlet is a large central duct through the stern of the vessel just on the water line. Steering is effected by a hydraulically operated steering cylinder which moves a deflector plate 59 to direct the water jet produced by the unit 53 to port or starboard. The jet drive outlet and steering deflector are protected by the transom overhang during the launch and recovery of towed bladders. All controls for the engine 50 and water jet unit 53 are located in the wheelhouse.

The water jet from the jet drive unit 53, as well as providing propulsion, also serves to entrain the oil/water mix that bypasses the skimmer 11 and passes beneath the OSRV (principally via channels 24, 25); this entrainment helps to prevent a "pile up" of oil/water at the front of the OSRV.

As the transmission from the engine 50 to the water jet unit 53 is reversible, the flow of water through the unit 53 can be reversed to enable "back-flushing" of the jet drive intake screen 58 in the event of blockage by debris; this eliminates the need to dive under the boat to clear debris which can be hazardous in certain environments (for example, swamplands where alligators may be present or at sea in shark infested waters).

The propulsion system is selected to give a speed of the order of 18-20 knots for transit to/from an oil spill site and a slow seed of 1-3 knots for use when skimming to recover oil. Typical range is of the order of 180 nautical miles.

Regarding the central services, dual pressure hydraulic power is provided by two tandem mounted hydraulic pumps 55 driven by a transmission mounted power take off unit 54 (alternatively, this power take off may be integral with the gearbox 52). The hydraulic pump 55 supplies a central pressurized ring main (not shown, but typically stainless steel tube or similar) that distributes hydraulic pressure around the vessel; the pressurized ring main is matched by a corresponding return ring main. Drip-less quick release pressure/return connectors are strategically installed around the pressurized ring main for powering standard-supply or optional equipment. One use of this hydraulic power is to drive a hydraulically powered electric alternator unit 56 providing 110 volt ac supply as a central service; advantageously, the alternator is a synchronous spark free alternator. Another use of the power provided by the central hydraulic service is to power the skimmer unit 11 and an associated lifting arrangement. Other equipment that can conveniently be powered from the central hydraulic service includes pressure washing equipment, power capstans, fire fighting pumps and/or other ancillary equipment/controls, by simply "plugging in".

Oil Recovery System

The oil recovery system of OSRV 10 comprises the skimmer unit 11, the on-board oil handling and processing system (including the oil/water separators 100), and the oil transfer bollard 15. Before describing the oil/water separators 100 in detail, a general description of the oil recovery system will first be given with reference to FIGS. 4 and 5 (certain external features of the OSRV, such as the aft deck rail 30, have been omitted from these Figures so as not to obscure internal layout details).

As already noted, the skimmer unit 11 can be raised out of the water when not needed (the position of the unit 11 when raised is shown in dashed outline in FIG. 5), and subsequently lowered back into its operating position (shown in full lines in FIG. 5). Raising and lowering of the skimming unit is effected by a lift arrangement 80 powered from the central hydraulic service. The skimmer unit 11 is, for example, a floating drum oil skimmer such as the Elastec TDS118G model available from Elastec/American Marine, Ill., USA; this model has a maximum collection rate of 78 US gallons per minute (16 tonnes per hour). When in its operational position, the skimmer unit is free-floating but constrained in position by a 'cat's cradle' of wires. Other types of skimmer and installation arrangement can alternatively be used.

Oil recovered by the skimmer unit 11 is pumped away from the unit through flexible hose 60 and then through fixed pipe-work 60 to a directional manifold valve 62 that permits the recovered oil, still with a small amount of water (e.g. 3%), to be selectively fed either direct to the oil transfer bollard 15 for transfer to a towed storage bladder 19 (as depicted in FIG. 1), or first to the separators 100 for removal of most of the remaining water and from there, via pumps 63 and valves 64 (only referenced in FIG. 5 in respect of one of the separators 100) to the oil transfer bollard 15. Preferably, the valves of the directional manifold valve 62 and the valves 64 operate on an interlocked basis to ensure only permitted flows are possible.

Oil/Water Separator

The form of the oil/water separators 100 will next be described with reference to FIGS. 6 to 9. Generally this description will be given with respect to use aboard OSRV 10; however, the form of separator described below can also be used in other contexts.

Each separator 100 is formed by a V-bottomed rectangular tank structure 101 that is vertically divided up into four main compartments:

An oil/water compartment 102 arranged to receive, through inlet pipe 110, the oil/water mix coming from the skimmer unit 11; the bottom of the pipe 110 defines an oil/water mix inlet into the compartment 102. The compartment 102 is sub-divided by an apertured horizontal splash plate 106 (shown in thick dashed lines in FIG. 6) into:
an upper sub-compartment 102U principally for accumulating oil free of water—this oil can be drawn off (for example by pump 63 shown in FIG. 5) through a suction pipe 111 that terminates in the sub-compartment 102U (the bottom of the pipe being fixed in position and defining an oil suction outlet); and
a lower sub-compartment 102L in the V-bottom of the tank 101 into which water from the incoming oil/water mix can sink.

A water compartment 103 for the water separated from the incoming oil/water mix; this compartment communicates with the lower sub-compartment 102L of the oil/water compartment 102 through the V-bottom of the tank 101. The horizontal cross-sectional area of the water compartment 103 is substantially less (for example by a factor of four or more) than that of the oil/water compartment 102. A water discharge pipe 112 defining a water discharge outlet, is located in the end of the tank structure 101 that delimits the compartment 103 on its side furthest from the compartment 102. As used herein, the term "water discharge level" (or "WD-level") means the water level in the compartment 103 at which water starts to discharge from the tank 101 unassisted; the WD-level is indicated by dashed line 125 in FIGS. 7-9 and, in the present example, is set by the vertical positioning of the discharge pipe 112 (this positioning is discussed below).

Two hydraulic-fluid (HF) compartments 104, 105 that sandwich the upper sub-compartment 102U of the oil/water compartment 102. The HF compartment 104 extends down into the V-bottom of the tank 101 whereas the HF compartment 105, which lies between the oil/water compartment 102 and the water compartment 103, only extends down to the level of the splash plate 106 thereby enabling communication between the sub-compartment 102L and the compartment 103 through the section of the tank structure V-bottom that extends beneath the HF compartment 105. Pipes 108, 109 extend through the compartment 102 at a low level between the HF compartments 104, 105 allowing hydraulic fluid to flow between these compartments; the internal diameter of the pipes 108, 109 is, for example, around 5 cm.

In the present example form of the separator 100, the overall dimensions of the tank structure 101 are: length 1.32 m×width 0.56 m×height 0.67 m. Taking account of the V bottom, this gives the tank structure 101 an overall capacity of substantially 350 liters. Of this 350 liters, approximately 80 liters is used for the HF compartments 104, 105 taken together, 225 liters for the compartment 102, and 40 liters for the compartment 103 (the remainder being the space under compartment 105).

The top of the tank structure 101 is provided with removable inspection plates 119 providing access to the compartments 102 and 103.

In the sub-compartment 102U, a V-shaped, or other upwardly-open concave shape, plate 120 (see FIGS. 7 to 9) is positioned below the inlet pipe 110 to spread out the incoming flow of the oil/water mix and prevent direct flow pressure on the splash plate 106. Regarding the splash plate 106, this extends the full length and breadth of the compartment 102. The splash plate 106 has a series of apertures 107 (each of a size, for example, of 2×3 cm) adjacent the tank structure sides to allow water to pass through into the lower sub-compartment 102L.

The compartment 103 is provided with upstanding "stalagmite" baffles 121 that terminate above the level of the splash plate 106. These stalagmite baffles 121 alternate with downwardly-projecting "stalactite" baffles 122 that terminate approximately 5 cm above the lowest point of the V bottom of the tank structure 101. The baffles 121,122 extend the full width of the tank structure 101 and define a vertically serpentine flow path between the V-bottom entry into the compartment 103 and the water discharge pipe 112. In the first inter-stalagmite space (that is, first upper bend in the serpentine flow path), the compartment 103 is provided with a secondary oil suction pipe 113 which terminates above the level of the water discharge pipe 112 and enables the drawing off of any oil that has managed to penetrate into the compartment 103.

The HF compartments 104, 105 serve as the hydraulic fluid reservoirs for the central hydraulic service of the OSRV 10 and are arranged to be filled via filler pipe 115 at the top of HF compartment 105; a small vent pipe 116 at the top of the HF compartment 104 prevents air locks during filling. An outlet pipe 117 for hydraulic fluid is provided in the bottom of the HF compartment 104 and a return pipe 118 is provided at the top of HF compartment 105. When two separators 100 are installed, as in the OSRV 10, hydraulic fluid is supplied from the outlet pipe 117 of one separator and is returned to the return pipe 118 of the other separator, and the HF compartments of the two separators are cross-connected by the otherwise-unused outlet and return pipes 117, 118.

In respect of operation of the separator 100, the role of the HF compartments 104, 105 (and their interconnecting pipes 108, 109) is to heat the oil in the compartment 102 to reduce its viscosity, particularly in low temperature conditions; this facilitates the pumped transfer of the oil from the separator 100. It will be appreciated that in use hydraulic fluid gets hot and is well suited to the task of heating the oil in compartment 102. This is particularly the case in the context of use of the separator onboard the OSRV 10 since the hydraulic fluid will generally always be being used and heated whenever the skimmer 11 is in use; indeed, there will generally be a minimum of four items of equipment causing heating of the hydraulic fluid when the separator is in use, these being: the tandem mounted hydraulic pumps 55, the skimmer drum drive motor, the hydraulic pump 73 at the back of the skimmer unit, and the hydraulically powered drive motor of the 110V alternator electric power unit 56.

The pipes 108 and 109 are preferably positioned at substantially the same height as, or a little below, the bottom end of the oil suction tube 111 to ensure oil in this zone is well heated thereby to facilitate the sucking up of oil up through the pipe 111. The V-shaped form of the tank structure 101 and the disposition of the compartments 104, 105 optimizes the heating of the oil (which resides principally in the sub-compartment 102U) relative to heating of the water (in the smaller sub-compartment 102L and compartment 103, neither of which is sandwiched between the HF compartments 104, 105).

The hydraulic fluid is, of course, cooled by loss of heat to the oil in the separator sub-compartment 102U. However, since the separator 100 will not be in use the whole time that the hydraulic services of the OSRV are required, it will generally be necessary to provide additional cooling for the hydraulic fluid such as a seawater cooler (not shown) located directly downstream of the hydraulic fluid outlet pipe 117.

To operate correctly the separator 100 should be securely mounted in an upright position. In the context of the described OSRV 10, two separators 100 are provided in the OSRV compartment defined between the fireproof bulkheads 40 and 41, one in each side hull 21 and 22 of the trimaran main section 13. The V-bottoms of the separator tank structures 101 enable the tank structures to sit well down in the downwardly-tapering side hulls thereby aiding the stability of the OSRV 10.

The operation of the separator 100 will next be described. Two different operational modes are possible:

a 'continuous mode' in which suction is continuously applied to the oil suction pipe 111 and the oil level in the sub-compartment 102U is kept down substantially to the level of the suction pipe; and an 'intermittent mode' in which suction is only applied intermittently to the suction pipe 111, in particular, suction is applied:

from when the oil reaches an 'upper' level sensed by a upper-level sensor 130 (FIG. 7) and typically corresponding to the top of the tank structure 101 though it may be lower (provided it is above the WD-level 125), until the oil level has fallen to a 'lower' level as sensed by a lower-level sensor 131; for ease of explanation, the 'lower' level will be taken to be the level of the lower end of the suction pipe 111 (and in this case, the lower-level sensor 131, rather than directly sensing oil level, could sense when no more oil was being sucked up by the pipe 111).

It will be apparent that the intermittent mode of operation is cyclic in nature with the compartment 102 filling with oil and then being (partially) emptied each cycle.

Certain relationships in the dimensioning of the separator need to be satisfied in order to keep the separator operating optimally with the oil level in compartment 102 no lower than the plate 106 regardless of the ratio of oil to water in the flow of oil/water fed to the separator. These relationships are:

1. The oil suction pipe 111 (and preferably also the secondary oil suction pipe 113) should terminate at its lower end above the WD-level 125; this prevents water being sucked up through the pipe 111 should the incoming oil/water mix become largely water. This condition can be relaxed if it is acceptable to assume that the oil/water mix will always be less than 100% water (see below).

2. Bearing in mind that the height of the water column in the compartment 103 is limited by the WD-level 125 (which, in the present example, is set by the positioning of the water discharge pipe 112), the WD-level 125 should be positioned at or above the level at which the hydrostatic pressure produced by a column of water in the compartment 103 is adequate to match the hydrostatic pressure produced by a liquid column in compartment 102 comprising a water column up to the level of the splash plate 106, and an oil column surmounting the water column and extending to the bottom of the oil suction pipe 111 (where continuous mode operation is to be implemented) or the 'upper' level sensed by the upper-level sensor 130 (where intermittent mode operation is to be implemented). This relationship ensures that the oil can rise in the compartment 102 to the level of the suction pipe 111 (for continuous mode operation)/to the 'upper' level sensed by sensor 130 (for intermittent mode operation) without the level of the oil/water boundary in the compartment needing to fall below the plate 106.

It should be noted that some departure from the above relationships is possible, for example, if it is not considered critical that the oil/water boundary in the compartment 102 always remain above the plate 106 or if it is considered acceptable to assume that the oil/water mix will always lie in a given percentage oil:water ratio range less than the full 100:0 to 0:100 range (this may well be the case where the separator is always to be used with a drum skimmer unit as the percentage of water in the output of such units is rarely out of single figures—in this case, relationship (1) above can be relaxed).

Prior to first use, clean water (that is, not contaminated with oil) is added to the compartment—for example, by removing the inspection plate 119—until the water reaches a predetermined 'initial filling' level 126 that is above the plate 106 (the top of the stalagmite baffles 121 should also be below the level 126). Furthermore, the 'initial filling' level 126 should be such that the initial volume of water above the plate 106 in the compartment 102 is as least as great as the volume in compartment 103 between the level 126 and the water level referred to in relationship (2) adequate to ensure that the oil can rise in the compartment 102 to the level of the suction pipe 111/the 'upper' level sensed by sensor 130 (depending on operational mode) without the level of the oil/water boundary in the compartment needing to fall below the plate 106. Generally, this initial filling of the separator will only need doing once since at the end of each use, there will remain an adequate level of water in the tank structure 101 for further filling to be unnecessary when the separator is next used.

Operation of the separator will now be described in the context of use onboard the OSRV 10. When the OSRV 10 is operating to recover oil (moving slowly ahead with the skimmer unit 11 in its lowered position and powered on), then assuming the directional manifold valve 62 is appropriately set, an oil/water mix is pumped into the separator compartment 102 through the inlet pipe 110. This mix will usually comprise around 3% water. However, consideration will first be given to the extreme case of 100% oil being fed into the separator; in this case, the oil accumulates on top of the water in the lower part of the compartment 102 (oil being less dense than water, crude oil having a specific gravity typically in the range 0.87 to 0.92). This results in the water level in compartment 102 falling as water is pushed into compartment 103 until the hydrostatic pressures produced by the columns of liquid in the compartments 102 and 103 balance each other. However, before the water level in compartment 103 reaches the WD-level 125 (the level of the discharge pipe 112 in the present example), the height of the water column in compartment 103 will be sufficient to balance a level of oil in the compartment that is up to the lower end of the oil suction pipe 111 (continuous mode operation)/up to the 'upper' level sensed by the sensor 130 (intermittent mode operation) and this is achieved without the water-oil boundary in compartment falling below the plate 106—this is as a consequence of relationship (2) above and the initial filling level 126. Oil is now drawn out of the compartment 102 through pipe 111.

In the opposite extreme case where 100% water is fed to the separator, the water level in compartments 102 and 103 will rise to the WD-level 125 and stay at this level as water flows out of the pipe 112. In respect of continuous mode operation, relationship (1) prevents water being sucked up through the oil suction pipe 11; in respect of intermittent mode operation, positioning of the 'upper' level sensed by sensor 130 above the WD-level 125 prevents water being sucked up through the oil suction pipe 11.

In practice, where the separator is being supplied with an oil/water mix from a drum skimmer unit, the oil/water mix will normally have a single figure percentage of water in it provided the skimmer unit is functioning correctly. The separator 100 thus operates initially similarly to the 100% oil extreme condition described above but the additional water in the incoming stream from the skimmer unit results in the level of the oil-water boundary in compartment 102 not falling as far. The continuing addition of water means that as the water level in compartment 103 gradually rises in order to continue to balance the column of oil and water in compartment 102, the water level in compartment 103 will eventually rise to the WD-level 125 and start to discharge through the discharge pipe 112. However, before this happens, in either mode of operation of the separator, the oil level in compartment 102 will have risen sufficiently that sucking of oil out of the compartment 102 will have commenced. As a result, in the continuous mode of operation, the total mix in the separator moves more and more to being 100% water, though it never reaches this, and the oil/water boundary in the compartment 102 will end up around the WD-level 125. In the intermittent mode of operation, once suction is triggered by the oil reaching the level of the upper-level sensor 130, it continues until the lower-level sensor 131 indicates that the surface level in compartment 103 has fallen to the 'lower' level, that is, the bottom of the suction pipe 111 of the pipe level; again, as in the continuous mode, the removal of oil through the suction pipe 111 has moved the total mix in the separator more and more to being 100% water without ever reaching this, and the oil/water boundary in the compartment 102 will end up around the WD-level 125, but below the bottom of pipe 111.

Figure 7:
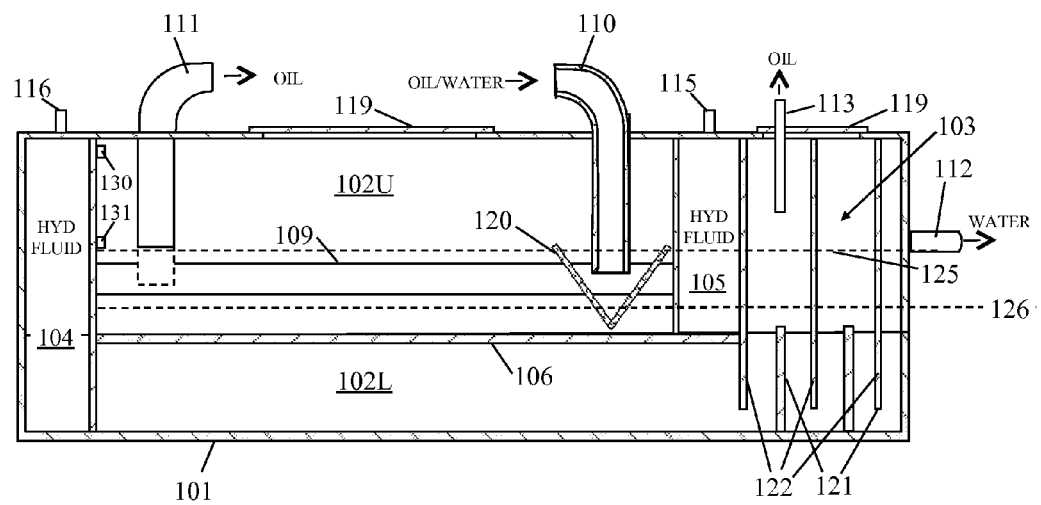
FIG. 7 is a longitudinal cross-sectional view through the FIG. 6 separator.
Figure 8:
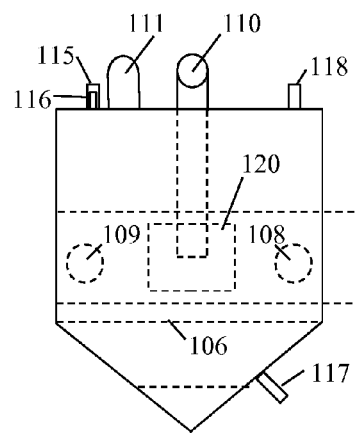
FIG. 8 is diagram showing, in elevation, one end of the FIG. 6 separator.
Figure 9:
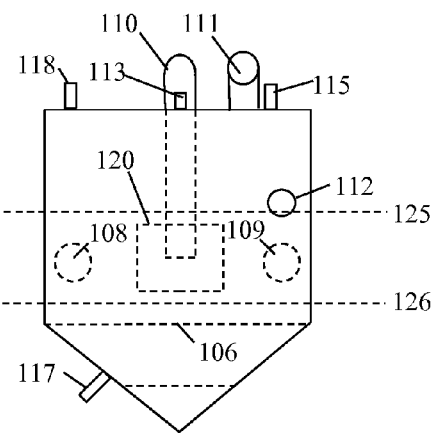
FIG. 9 is diagram showing, in elevation, the other end of the FIG. 6 separator.

As already noted, where the percentage of water in the oil/water mix fed to the separator can be relied upon to be in the single figure range (as with a drum skimmer), the bottom of the suction pipe 111 can be positioned lower than the WD-level 125 (see dashed downward extension of pipe 111 in FIG. 7). Such lower positioning of the bottom of the suction pipe 111 is advantageous as it enables more of the oil present in the sub-compartment 103U to be sucked out; furthermore, the bottom of the suction pipe 111 is closer to the pipes 108, 109 carrying the hot hydraulic fluid whereby the oil in the region of the suction pipe inlet will be heated and therefore flow more easily. The bottom of the suction pipe 111 should still be above the expected maximum level of the oil/water boundary in the sub-compartment 102U—this level is readily determined for any particular maximum percentage of water in the incoming oil/water mix and ranges from the initial filling level 126 (0% water) to the WD-level 125 (100% water).

It may also be noted with respect to intermittent mode operation, that if the lower-level sensor 131 is positioned offset from the level of the bottom of the oil suction pipe 111, then the 'lower' level sensed by this sensor must be such that, as the sucking out of oil brings the oil level in the compartment down to the lower-level sensor 131, the level of the oil/water boundary in compartment 102 remains below the bottom of the suction pipe 111 (this level is readily determined for any particular maximum percentage of water in the incoming oil/water mix).

The foregoing description of the operation of the separator 100 is based on ideal conditions in which mixing up of the oil and water in the separator due to motion of the latter or stirring caused by the incoming flow, does not occur. Of course, in practice this will not be the case but a number of features of the separator 100 serve to minimize mixing effects. Thus, as already noted, the V-shaped plate 120 deflects the incoming oil/water flow so that it doesn't force globules of oil down below the horizontal splash plate 106 which could then pass into the water compartment 103.

The apertured horizontal plate 106 is, of course, itself a defense against oil reaching the V bottom of the tank structure 101 and passing through into the compartment 103. The plate 106 also acts generally to calm motion of oil and water in the lower part of the compartment 102 when the separator is being buffeted about (either due to heavy sea conditions when skimming or when in high speed transit with some oil/water mix still in the separator). Severe movements of the oil/water mix are disadvantageous as they can lead to emulsification which, although oil/water separation is normally rapid, opens up the possibility of oil passing into the compartment 103.

The stalagmite and stalactite baffles 121, 122 in the water compartment 103 also serve to prevent oil reaching the water discharge outlet 112, as oil will tend to be trapped in the inter-stalactite spaces above the stalagmite 121 and, in particular, in the first of these spaces from where it can be drawn off through the secondary suction pipe 113.

The above-described form of oil/water separator provides a number of advantages, notably it is economical and simple to manufacture, maintenance free (apart from periodical cleaning) as it has no moving parts, and discharges separated water automatically. Furthermore, the separator is adapted to use at sea and the heating provided by the hydraulic fluid compartments assists pumping thicker oils in low temperatures.

It will be appreciated that many variations are possible to the described form of separator, including using different numbers of stalagmite and stalactite baffles 121, 122, using a different number of pipes 108, 109 linking the HF compartments 104, 105, and changing the number, form and placement of the apertures 107 in the horizontal plate 106. The tank structure 101 delimiting the compartments 102-105 can be formed by internally dividing a sufficiently large tank, by joining together smaller tanks, or by any other suitable fabrication method. Reference to the tank structure being vertically divided to form the compartments 102-105 is to be understood to encompass dividing walls that are both vertical and inclined (possibly substantially, for example at 30 degrees) to the vertical. The oil/water mix inlet, the oil suction outlet, and the water discharge outlet, can each be delimited by pipes or other means different in form to illustrated pipes 110, 111, and 112.

In the illustrated example, the WD-level 125 (the water level in compartment 103 at which water starts to discharge) is set by the positioning of the water discharge pipe 112;

however, this need not be the case. For example, the water discharge pipe could be put at the bottom of the tank structure and, in this case, the WD-level will be set by the height of the stalagmite baffles 121 (or more precisely, by the minimum level that water must reach to flow through the serpentine path delimited by vertical baffles 121, 122); the initial filling of the separator with water would then be done until water started to discharge (the initial filling level 126 and the WD-level 125 would thus be the same).

Furthermore, the form of the bottom portion of the tank structure (V-shaped in the illustrated example) can be varied, for example, to fit the hull shape of the vessel in which the separator is mounted. Possible variant forms for the bottom portion include U-shaped or only having one side angled towards the opposite, but still vertical side. In this latter case, the apertures in the horizontal plate 106 could be provided above the deepest part of the bottom, that is, just along one side. Although it is preferred that the bottom portion of the tank structure has a form that reduces in width downwardly, the tank structure could be made with a constant width over its full depth.

Regarding the placement of the HF compartments, rather than having an opposed pair of compartments sandwiching the compartment 102U lengthwise of the tank structure (so that one of the HF compartments is disposed between the compartments 102U, 103), it is alternatively possible to use a pair of opposed HF compartments sandwiching the compartment 102U laterally. As a further alternative, two opposed pairs of HF compartments could be provided at right angles to each other to surround the sub-compartment 102U completely (with inter-connecting pipes being provided as appropriate). Furthermore, in some examples, rather than using one or more opposed pairs of HF compartments to heat the compartment 102 U, heating of the latter is enabled by providing one or more HF compartments that adjoin the compartment 102 U but are not arranged opposed pairs.

As for the oil suction pipe 111, this can be given an inverted U-form with one leg being outside the tank structure and the top of the U form below the top of the sub-compartment 102U. In this case, with the external leg of the inverted U-form suction pipe 111 connected by hose to the suction pump 63, once the oil in the sub-compartment reaches a high enough level, it will siphon over and this effect can be used to auto prime the pump.

Although the operation of the separator has been described above in relation to use onboard an oil-skimming vessel, it is to be understood that the separator can also be used in other contexts, including on land. For land-based applications, rather than using hydraulic fluid to heat the oil in compartment 102U, alternative heat sources can be used instead to provide heated fluid to the compartments 104, 105 such as a hot water/hot oil heating system (available, for example, from Eberspächer GmbH of Germany). Indeed, even onboard, an alternative heat source could be used (such as engine oil).

Although it has been assumed that oil will be pumped from the separator for storage (for example in towed bladder 19 as in FIG. 1, or to a deck-stowed bladder or tank), the separator 100 can itself be used for temporary storage of limited quantities of oil. When a separator 100 is used for storage purposes, then if the separator is configured for intermittent mode operation and is accordingly provided with an upper-level sensor 130, this sensor can be used to determine when the supply of oil/water mix from the skimmer unit should be shut off (rather than determining when the sucking out of oil should commence).

It is to be understood that various features of the separator 100 can be used independently of each other. For example, while the apertured horizontal plate 106 and the HF tanks used for heating are both advantageous aboard an oil spill recovery vessel, it would be possible to provide one without the other both in onboard environments and on land. Thus, in examples of the invention, an oil/water separator can be arranged to have its oil/water inlet compartment heated by at least one adjoining HF compartment without requiring the provision of an apertured horizontal plate within the oil/water inlet compartment.

Conversely, an oil/water separator can be provided with an apertured horizontal plate within its oil/water inlet compartment without requiring the provision of an HF compartment adjoining the oil/water inlet compartment to heat it. In this latter case, there can be seen to be provided:

an oil/water separator comprising a tank structure divided into first and second compartments that communicate via a bottom channel, an oil/water inlet into the first compartment for supplying an oil/water mix to be separated, a fixed oil suction outlet for drawing oil out of the first compartment, and a water discharge outlet in the second compartment from which water is arranged to start to discharge unassisted once the water level in the second compartment has reached a predetermined level, herein the water discharge level; the first compartment being provided with an apertured horizontal plate that extends across the whole of the first compartment at a level that is below that of the input opening and below the water discharge level but above the bottom channel whereby water entering the first compartment through said inlet opening must pass through the apertured horizontal plate to enter the second compartment via the bottom channel.

Furthermore, in some examples of separators of this form, the relative vertical positionings of the horizontal plate, oil suction outlet and water discharge level is such that the hydrostatic pressure produced by a column of water in the second compartment up to the water discharge level at least matches the hydrostatic pressure produced by a liquid column in the first compartment comprising a water column up to the level of the splash plate, and an oil column surmounting the water column and extending to a level, herein the oil discharge level, that is at least as high as the bottom of the oil suction outlet.

In another combination of features, an oil/water separator can be arranged to have its oil/water inlet compartment heated by at least one pair of opposed heating compartments sandwiching the oil/water inlet compartment without requiring either the heating compartments to serve as HF reservoirs, or the provision of an apertured horizontal plate within the oil/water inlet compartment. In this case, a heating medium such as hot water or engine oil could be passed through the heating compartments in order to heat the oil in the oil/water inlet compartment.

The invention claimed is:

1. An oil/water separator comprising a tank structure divided into first and second compartments that communicate via a bottom channel, an oil/water inlet into the first compartment for supplying an oil/water mix to be separated, an oil suction outlet for drawing oil out of the first compartment, and a water discharge outlet in the second compartment from which water is arranged to start to discharge unassisted once the water level in the second compartment has reached a predetermined level, herein the water discharge level; the tank structure being further divided to provide at least one heating compartment adjoining the first compartment and arranged to act as a reservoir for hydraulic fluid whereby to enable oil in the first compartment to be heated to reduce its viscosity by heat given up by hydraulic fluid returned to the heating compartment after operational use.

2. An oil/water separator according to claim 1, wherein the said at least one heating compartment comprises at least one pair of opposed heating compartments sandwiching the first compartment.

3. An oil/water separator according to claim 2, wherein the heating compartments inter-communicate through pipes that pass through the first compartment.

4. An oil/water separator according to claim 3, wherein the pipes that inter-communicate the heating compartments are positioned at the level of the oil suction outlet.

5. An oil/water separator according to claim 2, wherein said at least one pair of opposed heating compartments comprises a pair of opposed heating compartments that has one of its heating compartments disposed between the first and second compartments and above the bottom channel that communicates the first and second compartments.

6. An oil/water separator according to claim 2, wherein said at least one pair of opposed heating compartments comprises two pairs of opposed heating compartments arranged at right angles to each other and together surrounding the first compartment.

7. An oil/water separator according to claim 1, wherein said at least one heating compartment is fitted with input and/or output connections for hydraulic lines.

8. An oil spill recovery vessel comprising an oil/water separator according to claim 1, a hydraulically-powered skimmer unit which in operation provides a flow of recovered oil/water mix, and a system for providing hydraulic power to the skimmer unit; the oil/water inlet of the separator being connected to receive the recovered oil/water mix provided by the skimmer unit when in operation; and the system for providing hydraulic power including a hydraulic fluid reservoir formed by the said at least one heating compartment of the oil/water separator, and a hydraulic circuit for supplying hydraulic fluid from the reservoir under pressure to the skimmer unit and returning it to the reservoir.

9. An oil spill recovery vessel according to claim 8, wherein the oil/water separator has at least one pair of opposed heating compartments sandwiching the first compartment.

10. An oil spill recovery vessel according to claim 8, including port and starboard outer hulls, and two said oil/water separators respectively mounted in the port and starboard outer hulls, the oil/water inlets of the separators being connectable to receive the recovered oil/water mix provided by the skimmer unit when in operation and said reservoir being formed by the heating compartments of both oil/water separators.

11. An oil/water separator according to claim 1, wherein the separator includes an oil removal arrangement for sucking oil out of the first compartment through the oil suction outlet, the oil removal arrangement being arranged to operate continuously.

12. An oil/water separator according to claim 11, wherein the oil suction outlet is at least as high as said water discharge level.

13. An oil/water separator according to claim 1, wherein the separator includes an oil removal arrangement for sucking oil out of the first compartment through the oil suction outlet, the oil removal arrangement including upper and lower oil-level sensors respectively arranged to detect the oil level in the first compartment rising to an upper level, and falling to a lower level; the oil removal arrangement being arranged to operate intermittently with the sucking out of oil through the oil suction outlet commencing when the oil level in the first compartment reaches said upper level detected by the upper oil-level sensor, and subsequently terminating when the oil level in the first compartment falls to said lower level detected by the lower oil-level sensor.

14. An oil/water separator according to claim 13, wherein the lower level detected by the lower oil-level sensor corresponds to the oil suction outlet, the latter being at least as high as said water discharge level.

15. An oil/water separator according to claim 1, wherein the second compartment includes a series of vertical baffles defining a vertically serpentine flow path between the bottom channel entry into the second compartment and the water discharge outlet.

16. An oil/water separator according to claim 1, wherein the water discharge level is determined by the position of the water discharge outlet.

17. An oil/water separator according to claim 14, wherein the water discharge level is determined by the minimum level that water must reach to flow through a series of vertical baffles.

18. An oil/water separator according to claim 1, wherein the oil/water inlet is provided by a pipe that extends down into the first compartment and terminates opposite an upwardly-open concave baffle.

19. An oil/water separator according to claim 1, wherein the oil suction outlet is provided by a pipe of inverted U-form with one leg being outside the tank structure and the top of the U-form below the top of the oil/water compartment whereby upon the oil in the sub-compartment reaching a high enough level, it will siphon over into the external leg of the pipe.

20. An oil/water separator according to claim 1, wherein the first compartment is provided with an apertured horizontal plate that extends across the whole of the first compartment at a level that is below that of an input opening and below the water discharge level but above the bottom channel whereby water entering the first compartment through said inlet opening must pass through the apertured horizontal plate to enter the second compartment via the bottom channel.

\* \* \* \* \*